United States Patent

Dubois et al.

[11] Patent Number: 5,888,661
[45] Date of Patent: *Mar. 30, 1999

[54] QUASICRYSTALLINE ALUMINUM HEAT PROTECTION ELEMENT AND THERMAL SPRAY METHOD TO FORM ELEMENTS

[75] Inventors: Jean-Marie Dubois, Pompey; Pierre Archambault, Nancy; Bernard Colleret, Jarville, all of France

[73] Assignee: Centre National de la Recherche Scientifique, Paris, France

[*] Notice: The term of this patent shall not extend beyond the expiration date of Pat. No. 5,432,011.

[21] Appl. No.: 831,418

[22] Filed: Apr. 1, 1997

Related U.S. Application Data

[62] Division of Ser. No. 533,756, Sep. 26, 1995, Pat. No. 5,649,282, which is a division of Ser. No. 98,317, filed as PCT/FR92/01197, Dec. 17, 1992, 1993, Pat. No. 5,571,344.

[30] Foreign Application Priority Data

Dec. 20, 1991 [FR] France .................................. 91 15866

[51] Int. Cl.⁶ .................................. B22F 7/04; C23C 4/08
[52] U.S. Cl. .......................... 428/548; 428/549; 428/55; 428/650; 148/437; 148/403; 148/438; 148/439; 148/440; 427/456
[58] Field of Search .................................. 148/437, 403, 148/438, 439, 440; 428/548, 549, 551, 5, 650; 427/456; 420/529, 537, 548, 549, 550, 551, 552, 553

[56] References Cited

U.S. PATENT DOCUMENTS

| | | | |
|---|---|---|---|
| 4,595,429 | 6/1986 | LeCaér et al. | 148/403 |
| 4,710,246 | 12/1987 | Le Caer et al. | 148/403 |
| 4,731,133 | 3/1988 | Dermarkar | 148/437 |
| 5,204,191 | 4/1993 | Dubois et al. | 148/439 |
| 5,240,517 | 8/1993 | Matsumoto et al. | 148/437 |
| 5,397,490 | 3/1995 | Matsumoto et al. | 148/300 |
| 5,424,127 | 6/1995 | Dubois et la. | 428/373 |
| 5,432,011 | 7/1995 | Dubois et al. | 520/532 |
| 5,433,978 | 7/1995 | Shield et al. | 148/403 |
| 5,472,920 | 12/1995 | Dubois et al. | 501/103 |

FOREIGN PATENT DOCUMENTS 0 100 287  2/1984  European Pat. Off. .
0 356 287  2/1990  European Pat. Off. .

OTHER PUBLICATIONS

He, L. X., "Stable Al–Cu–Co decagonal quasicrystals with decaprismatic solidification morphology", *Philosophical Magazine Letters*, vol. 61, No, 1, pp. 15–19 (1990).

Sterurer, W., "Five–Dimensional Structure Refinement of Decagonal $Al_{65}Cu_{20}Co_{15}$", *Philosophical Magazine Letters*, vol. 62, No. 3, pp. 175–182 (1990).

(List continued on next page.)

*Primary Examiner*—Margery Phipps
*Attorney, Agent, or Firm*—Foley & Lardner

[57] ABSTRACT

A composite structure including a substrate and a heat protection element on the substrate, wherein the heat protection element includes a quasicrystalline aluminum alloy of one or a number of quasicrystalline phases which are either quasicrystalline phases in the strict sense, or approximating phases, wherein the quasicrystalline phases exhibit a thermal diffusivity, measured at ambient temperature, lower than $2.5 \times 10^{-6}$ m²/s, and a thermal diffusivity measured in the temperature range 650°–750° C. which does not exceed the thermal diffusivity measured at ambient temperature by more than a factor of 3, and wherein the quasicrystalline aluminum alloy comprises $Al_aPd_bMn_cX_dY_eT_fI_g$, wherein X represents at least one metalloid selected from the group consisting of B, C, Si, Ge, P, and S; Y represents at least one metal selected from the group consisting of Fe, Mn, V, Ni, Cr, Zr, Hf, Mo, W, Nb, Ti, Rh, Ru, Re, and Ta; T is at least one rare earth; I represents the unavoidable production impurities; and wherein a+b+c+d+e+f+g=100 atom %; $15 \leq b \leq 25$; $6 \leq c \leq 16$; $21 \leq b+c+e \leq 45$; $0 \leq f \leq 4$; $0 \leq g \leq 2$; $0 \leq d \leq 5$.

14 Claims, 3 Drawing Sheets

OTHER PUBLICATIONS

Dubois, J. M. et al., "Quasicrystalline low–friction coatings", *Journal of Materials Science Letters 10*, pp. 537–541 (1991).

Tsai, An–Pang et al., "A Stable Quasicrystal in Al–Cu–Fe System", *Japanese Journal of Applied Physics*, vol. 26, No. 9, pp. L1505–L1507 (Sep. 1987).

M. Audier et al., "Quasicrystals and Incommensurate Structures in Condensed Matter", World Scientific, Third International Meet on Quasicrystals, (1989).

Webster's II Dictionary p. 784, 1984.

Shechtman, D. et al., "Metallic Phase with Long–Range Orientational Order and No Translational Symmetry", Phyhsical Review Letters, vol. 53, No. 20, pp. 1951–1953 (Nov. 12, 1984).

Bendersky, L., "Quasicrystal with One–Dimensional Translational Symmetry and a Tenfold Rotation Axis", *Physical Review Letters*, vol. 55, No. 14, pp. 1461–1463 (Sep. 30, 1985).

Dubois, J. M. et al., "Diffraction Approach to the Structure of Decagonal Quasi–Crystals", *Physics Letters A*, vol. 117, No. 8, pp. 421–427 (Sep. 8, 1986).

Audier, M. et al., "Microcrystalline AlFeCu Phase of Pseudo Icosahedral Symmetry", *World Scientific*, pp. 74–91 (1989).

Dong, C. et al., "Quasicrystals and Crystalline Phases in $Al_{65}Cu_{20}Fe_{10}Cr_5$ Alloy", *Journal of Materials Science.* 26, pp. 1647–1654 (1991).

Dong, C. et al., "Neutron Diffraction Study of the Peritectic Growth of the $Al_{65}Cu_{20}Fe_{15}$ Icosaheral Quasicrystal", *J. Phys.: Condens. Matter 2*, pp. 6339–6360 (1990).

Taylor, M.A., "Intermettalic Phases in the Aluminum–Manganese Binary System", *ACTA Metallurgica*, vol. 8, pp. 256–262, (Apr. 1960).

Degiovanni, A., "Identification de la diffusivité thermique par l'utilisation des moments temporels particels", *High Temperatures–High Pressures*, vol. 17, pp. 683–689 (1985).

Black, P.J., "The Structure of $FeAl_3$. I", *Acta Cryst.* 8., pp. 43–48 (1955).

Tsai, An–Pang et al; J. Mater. Res vol. 6, No. 12, Dec. 1991, 2646–2652 Yokoyama, Yoshihiko et al., Jpn J Apps Phys vol. 33 (1994) 4012–4020.

QUASICRYSTALLINE ALUMINUM HEAT PROTECTION ELEMENT AND THERMAL SPRAY METHOD TO FORM ELEMENTS

This application is a division of application Ser. No. 08/533,756, filed Sep. 26, 1995 now U.S. Pat. No. 5,649,282 which is a division application of Ser. No. 08/098,317 filed Aug. 9, 1993 now U.S. Pat. No. 5,571,344, which is the national stage of PCT/FR92/01197, Dec. 17, 1992.

BACKGROUND OF THE INVENTION

1. Field of the Invention

The present invention relates to heat protection elements made of quasicrystalline aluminum alloys.

2. Description of the Prior Art

Heat barriers are assemblies of one or more materials intended to limit the heat transfer towards or from parts and components of fittings in many household or industrial devices. It is possible, for example, to mention the use of heat barriers in heating or cooking devices, smoothing irons where the hot part is attached to the body and near heat insulation; in automobiles, at a number of points such as the turbocompressor, the exhaust system, insulation of the cabin, and the like; and in aeronautics, for example on the rear part of compressors and jet engines.

Heat barriers are sometimes employed in isolation in the form of screening, but very frequently they are used directly in combination with the source of heat or the part to be protected for reasons of mechanical behavior. Thus, use is made of sheets of mica, of ceramic plates and the like in electrical household appliances by fitting them by screwing or adhesive bonding, or else of sheets of agglomerated glass wool which are supported by a sheet of metal. A particularly advantageous process for attaching a heat barrier to a part, in particular to a metal part, consists in depositing onto a substrate the material forming the barrier in the form of a layer of thickness determined by a thermal-spraying technique such as, for example, plasma spraying.

It is very frequently recommended to use the heat barrier, which may furthermore comprise a number of layers, in combination with other materials which are also deposited as a layer by thermal spraying. These other materials may be intended to provide the barrier with protection against external actions such as, for example, mechanical impacts, a corrosive environment and the like, or else to make it easier to bond to the underlying substrate. This point is particularly important in the case of heat barriers operating in heat cycling conditions or at high temperature. The mechanical stresses which then exist at the interface with the substrate and result from the differences in the thermal expansion coefficients of the substrate and of the deposit quickly lead to damage of the barrier by shearing, when they do not prohibit its use. To overcome this disadvantage, use is frequently made of an intermediate deposit, called bond coat, which becomes plastic in the working temperature region of the barrier, and this eliminates the stresses at the barrier interface.

The material most frequently employed in aeronautics to form heat barriers is yttriated zirconia, which withstands very high temperatures. The deposition of the zirconia is carried out by plasma spraying using a conventional technique starting with the powdered material. Zirconia has a low thermal diffusivity ($\alpha=10^{-6}$ m$^2$/s). However, it has a relatively high specific mass $\rho$, and this constitutes a disadvantage in certain applications; moreover, some of its mechanical properties, such as hardness and resistance to wear and to abrasion, are low.

Other materials are employed as heat barrier. Mention may be made of alumina, which has a specific mass lower than that of zirconia, and a diffusivity and specific heat which are higher than that of zirconia, but whose mechanical properties are not satisfactory. It is also possible to mention stainless steels and some refractory steels which offer heat insulation properties but which have a high specific mass.

SUMMARY OF THE INVENTION

The objective of the present invention is to provide heat protection elements in the form of heat barrier or in the form of bond coat for heat barriers, exhibiting good thermal insulation properties, good mechanical properties, a low specific mass, good resistance to corrosion, especially to oxidation, and great ease of processing.

An element for heat protection of a substrate of the present invention is characterized in that it consists of a material which is deposited on the substrate by thermal spraying and which consists essentially of a quasicrystalline aluminum alloy exhibiting a thermal diffusivity, measured at ambient temperature, which is lower than $2.5 \times 10^{-6}$ m$^2$/s, and a thermal diffusivity measured in the temperature range 650°–750° C. which does not exceed the thermal diffusivity measured at ambient temperature by more than a factor of 3. The diffusivity at ambient temperature is preferably lower than $1.6 \times 10^{-6}$ m$^2$/s.

DETAILED DESCRIPTION OF THE PREFERRED EMBODIMENTS

In the present text "quasicrystalline alloy" is intended to mean an alloy consisting of one or a number of quasicrystalline phases which are either quasicrystalline phases in the strict sense, or approximating phases. Quasicrystalline phases in the strict sense are phases which have symmetries of rotation that are normally incompatible with the symmetry of translation, that is to say symmetries with an axis of rotation of order 5, 8, 10 and 12, these symmetries being disclosed by radiation diffraction. By way of example there may be mentioned the icosahedral phase of point group m35 (cf. D. Shechtman, I. Blech, D. Gratias, J. W. Cahn, Metallic Phase with Long-Range Orientational Order and No Translational Symmetry, Physical Review Letters, Vol. 53, No. 20, 1984, pages 1951–1953) and the decagonal phase of point group 10/mmm (cf. L. Bendersky, Quasicrystal with One Dimensional Translational Symmetry and a Tenfold Rotation Axis, Physical Review Letters, Vol. 55, No. 14, 1985, pages 1461–1463). The x-ray diffraction pattern of a true decagonal phase has been published in "Diffraction approach to the structure of decagonal quasicrystals, J. M. Dubois, C. Janot, J. Pannetier, A. Pianelli, Physics Letters A 117-8 (1986) 421–427".

The approximating phases or approximating compounds are true crystals insofar as their crystallographic structure remains compatible with the symmetry of translation, but which, in the electron diffraction pattern, exhibit diffraction figures whose symmetry is close to the axes of rotation 5, 8, 10 or 12.

Among these phases it is possible to cite as an example the orthorhombic phase $O_1$, characteristic of an alloy which has the atomic composition $Al_{65}Cu_{20}Fe_{10}Cr_5$, the lattice constants of which are: $a_o^{(1)}=2.366$, $b_o^{(1)}=1.267$, $c_o^{(1)}=3.252$, in nanometers. This orthorhombic phase $O_1$ is said to be approximating the decagonal phase. It is furthermore so close to it that its x-ray diffraction pattern cannot be distinguished from that of the decagonal phase.

It is also possible to cite the rhombohedral phase with constants $a_R=3.208$ nm, $\alpha=36°$, present in the alloys of composition close to $Al_{64}Cu_{24}Fe_{12}$ in number of atoms (M. Audier and P. Guyot, Microcrystalline AlFeCu Phase of Pseudo Icosahedral Symmetry, in Quasicrystals, eds. M. V. Jaric and S. Lundqvist, World Scientific, Singapore, 1989). This phase is a phase approximating the icosahedral phase.

It is also possible to mention orthorhombic phases $O_2$ and $O_3$ with corresponding constants $a_o^2=3.83$, $b_o^{(2)}=0.41$, $c_o^{(2)}=5.26$ and $a_o^{(3)}=3.25$, $b_o^{(3)}=0.41$, $c_o^{(3)}=9.8$, in nanometers, which are present in an alloy of composition $Al_{63}Cu_{17.5}Co_{17.5}Si_2$ in number of atoms or else the orthorhombic phase $O_4$ with constants $a_o^{(4)}1.46$, $b_o^{(4)}1.23$, $c_o^{(4)}=1.24$, in nanometers, which is formed in the alloy of composition $Al_{63}Cu_8Fe_{12}Cr_{12}$, in number of atoms.

It is further possible to mention a phase C, of cubic structure, very frequently observed as coexisting with the approximating or true quasicrystalline phases. This phase, which is formed in some Al—Cu—Fe and Al—Cu—Fe—Cr alloys, consists of a superstructure by chemical ordering of the alloy elements on the aluminium sites, the latter forming a Cs—Cl type structure with a lattice constant $a_1=0.297$ nm. A diffraction pattern of this cubic phase has been published (C. Dong, J. M. Dubois, M. de Boissieu, C. Janot; Neutron diffraction study of the peritectic growth of the $Al_{65}Cu_{20}Fe_{15}$ icosahedral quasicrystal; J. Phys. Condensed Matter, 2 (1990), 6339–6360) for a sample of pure cubic phase and of composition $Al_{65}CU_{20}Fe_{15}$, in number of atoms.

It is also possible to mention a phase H of hexagonal structure which derives directly from the C phase as demonstrated by the epitaxy relationships observed by electron microscopy between crystals of the C and H phases and the simple relationships which link the constants of the crystal lattices, namely $a_H=3\sqrt{2}a_1/\sqrt{3}$ (to within 4.5%) and $c_H=3\sqrt{3}a_1/2$ (to within 2.5%). This phase is isotypical with a hexagonal phase, written as ΦAlMn, discovered in Al—Mn alloys containing 40% by weight of Mn [M. A. Taylor, Intermetallic phases in the Aluminium-Manganese Binary System, Acta Metallurgica 8 (1960) 256].

The cubic phase, its superstructures and the phases which derive therefrom constitute a class of phases approximating the quasicrystalline phases of nearby composition.

Among the quasicrystalline alloys constituting the heat protection elements of the present invention there may be mentioned those which have one of the following nominal compositions:

$Al_aCu_bFe_cY_eI_g$, (I), in which Y denotes at least one element chosen from V, Mo, Ti, Zr, Nb, Cr, Mn, Ru, Rh, Ni, Mg, W, Si and the rare earths, I denotes the unavoidable production impurities, $0 \leq g \leq 2$, $14 \leq b \leq 30$, $7 \leq c \leq 20$, $0 \leq e \leq 10$, $c+e \geq 10$ and $a+b+c+e+g=100\%$ in number of atoms;

$Al_aCu_bFe_cX_dY_eI_g$, (II), in which X denotes at least one element chosen from B, C, P, S, Ge and Si, Y denotes at least one element chosen from V, Mo, Ti, Zr, Nb, Cr, Mn, Ru, Rh, Ni, Mg, W, Hf, Ta and the rare earths, I denotes the unavoidable production impurities, $0 \leq g \leq 2$, $14 \leq b \leq 30$, $7 \leq c \leq 20$, $0 \leq d \leq 5$, $21 \leq b+c+e \leq 45$, and $a+b+c+d+e+g=100\%$ in number of atoms;

$Al_aPd_bMn_cX_dY_eT_fI_g$ (III), in which X denotes at least one metalloid chosen from B, C, Si, Ge, P, and S; Y denotes at least one metal chosen from Fe, Mn, V, Ni, Cr, Zr, Hf, Mo, W, Nb, Ti, Rh, Ru, Re, Ta; T is at least one rare earth; I denotes the unavoidable production impurities; with $a+b+c+d+e+f+g=100$ atom %; $15 \leq b \leq 25$; $6 \leq c \leq 16$; $21 \leq b+c+e \leq 45$; $0 \leq f \leq 4$; $0 \leq g \leq 2$; $0 \leq d \leq 5$;

$Al_aCu_bCo_cX_dY_eT_fI_g$ (IV), in which X denotes at least one metalloid chosen from B, C, Si, Ge, P and S; Y denotes at least one metal chosen from Fe, Mn, V, Ni, Cr, Zr, Hf, Mo, W, Nb, Ti, Rh, Ru, Re; T is at least one rare earth; I denotes the unavoidable production impurities; with $a+b+c+d+e+f+g=100$ atom %; $14 \leq b \leq 27$; $8 \leq c \leq 24$; $28 \leq b+c+e \leq 45$; $0 \leq f \leq 4$; $0 \leq d \leq 5$; $0 \leq g \leq 2$;

$Al_aX_dY_eI_g$, (V), in which X denotes at least one element chosen from B, C, P, S, Ge and Si, Y denotes at least one element chosen from V, Mo Cr, Mn, Fe, Co, Ni, Ru, Rh and Pd, I denotes the unavoidable production impurities, $0 \leq g \leq 2$, $0 \leq d \leq 5$, $18 \leq e \leq 29$, and $a+d+e+g=100\%$ in number of atoms.

The materials employed for the production of heat protection elements according to the present invention have thermal diffusivity values $\alpha$ close to $10^{-6}$ m²/s which are very comparable to thermal diffusivity of zirconia. Bearing in mind the lower specific mass $\rho$ of these materials, the thermal conductivity $\lambda=\alpha\rho Cp$ in the vicinity of the ambient temperature does not exhibit any significant difference in relation to that of zirconia. The quasicrystalline alloys are therefore suitable substitutes for replacing many heat barrier materials, and in particular zirconia, in comparison with which they offer advantages of low specific mass and of excellent mechanical properties insofar as hardness and improved resistance to wear, to abrasion, to scratching and to corrosion are concerned.

The diffusivity of the materials constituting the heat protection elements of the present invention is reduced when the porosity of the materials increases. The porosity of a quasicrystalline alloy can be increased by an appropriate heat treatment. Thus, for example, the alloy $Al_{63.5}Cu_{24}Fe_{12.5}$, produced in the crude state, has a porosity of the order of 3%, measured on a metallographic section by conventional image analysis. After a heat treatment for three hours at 850° C. the porosity is of the order of 8%. It is particularly advantageous to employ quasicrystalline alloys which have a porosity higher than 10%.

The materials constituting the heat protection elements of the present invention may contain a small proportion of heat-conductive particles, for example crystals of metallic aluminum. The heat conduction of the material will be dominated by the conduction properties of the matrix as long as the particles do not coalesce, that is to say that their proportion by volume remains below the percolation threshold. In the case of approximately spherical particles which have a narrowly distributed radius this threshold lies in the region of 20%. This condition implies that the material constituting the heat protection element should contain at least 80% by volume of quasicrystalline phases as defined above.

At temperatures which are lower than approximately 700° C. the heat protection elements can be employed as heat barriers. Such temperature conditions correspond to most of the household applications or those in the automobile field. In addition, they are highly capable of withstanding the stresses due to the expansion of the support, and their expansion coefficient is intermediate between that of metal alloys and that of insulating oxides. In the case of temperatures which are higher than approximately 600° C. the quasicrystalline alloys constituting heat barriers may preferably contain stabilizing elements chosen from W, Zr, Ti, Rh, Nb, Hf and Ta. The content of stabilizing element is lower than or equal to 2% in number of atoms.

The heat barriers of the present invention may be multi-layer barriers which have an alternation of layers of materials which are good heat conductors and of layers of materials which are poor conductors (quasicrystalline alloys). Such structures form, for example, abradable heat barriers.

For applications in which the temperatures reach values higher than approximately 600° C., the heat protection elements of the present invention can be employed as bonding underlayer for a layer which is used as heat barrier and consists of a material of the prior art such as zirconia. In these temperature ranges the materials constituting the heat protection elements of the present invention become superplastic. They therefore correspond well to the conditions of use which are required for the production of a bonding underlayer, while being capable themselves of taking part in the insulation of the substrate. Thus, the heat protection elements of the present invention can be employed to within a few tens of degrees of the melting point of the material of which they consist. This limit lies in the region from 950° C. to 1200° C., depending on the composition.

A heat protection element of the present invention is produced by depositing the material(s) of which it consists as one or more layers on a substrate. The quasicrystalline material is deposited by a thermal spraying process, for example with the aid of an oxygen-gas torch, a supersonic torch or a plasma torch.

EXAMPLE 1

Different bulk samples of the alloys whose composition is given in Table 1 below, were produced by melting the pure elements in a high-frequency field under an argon atmosphere in a cooled copper crucible. The total mass thus produced was between 50 g and 100 g of alloy. The melting temperature, which depends on the composition of the alloy, is in the temperature range situated between 950° and 1200° C. While the alloy was kept molten, a solid cylindrical test piece 10±0.5 mm in diameter and a few cm in height was formed by sucking the liquid metal into a quartz tube. The rate of cooling of this sample was close to 250° C. per second. This sample was then cut up with a diamond saw to obtain cylindrical test pieces approximately 3 mm in thickness. The opposite faces of each cylinder were polished mechanically under water, great care being taken to guarantee their parallelism. The structural state of the test pieces was determined by x-ray diffraction and by electron microscopy. All the samples selected (samples 1 to 8) contained at least 90% by volume of quasicrystalline phase according to the definition given above.

EXAMPLE 2

The thermal diffusivity $\alpha$, the specific mass $\rho$ and the specific heat Cp were determined in the vicinity of the ambient temperature for the samples prepared above.

The thermal conductivity is given by the product $\lambda = \alpha \rho Cp$.

The thermal diffusivity $\alpha$ was determined with the aid of a laboratory device using the laser flash method in combination with an Hg—Cd—Te semiconductor detector. The laser was employed to provide pulses of power between 20 J and 30 J of $5 \times 10^{-4}$ s duration, to heat the front face of the test piece and the semiconductor thermometer was used to detect the thermal response on the opposite face of the test piece. The thermal diffusivity was deduced from the experiments by the method described in "A. Degiovanni, High Temp. -High Pressure, 17 (1985) 683.

The specific heat of the alloy was determined in the 20°–80° C. temperature range with a SETARAM scanning calorimeter.

The thermal conductivity $\lambda$ is deduced from the preceding two measurements, with the knowledge of the specific mass of the alloy, which was measured using Archimedes method by immersion in butyl phthalate maintained at 30° C. (±0.1° C.).

The values obtained are reported in Table 1. By way of comparison, this table contains the values relating to a few materials of the prior art, some of which are known as a heat barrier (samples 9 to 12).

TABLE 1

| | Composition | $\alpha$ $m^2 s^{-1} \times 10^6$ | $\rho$ $kg\ m^{-3}$ | Cp $J\ kg^{-1}/K^{-1}$ | $1 = \epsilon \rho Cp$ $W\ kg^{-1} K^{-1}$ | % by volume of majority phase |
|---|---|---|---|---|---|---|
| 1 | $Al_{13}Fe_4$ | 1.5 | 3870 | 610 | 2.95 | 100% m |
| 2 | $Al_{65.5}Cu_{18.5}Fe_8Cr_8$ | 1.05 | 4300 | 620 | 2.8 | 100% O/D |
| 3 | $Al_{65}Cu_{20}Fe_{10}Cr_5$ | 1.55 ± 0.1 | 4260 ± 150 | 680 | 4.5 | 100% O/D |
| 4 | $Al_{63.5}Cu_{24}Fe_{12.5}$ 3% porosity | 0.85 ± 0.02 | 3950 ± 200 | 600 | 2 | 100% R/I |
| 5 | $Al_{63.5}Cu_{24}Fe_{12.5}$ 8% porosity | 0.50 ± 0.02 | 3700 ± 200 | 590 | 1.1 | 100% R/I |
| 6 | $Al_{61.3}Cu_{23.6}Fe_{11.6}B_{3.5}$ | 1.15 | 3800 | 600 | 2.6 | >90% R/I |

TABLE 1-continued

| | Composition | $\alpha$ $m^2 s^{-1} \times 10^6$ | $\rho$ kg m$^{-3}$ | Cp J kg$^{-1}$/K$^{-1}$ | $\lambda = \epsilon\rho Cp$ W kg$^{-1}$K$^{-1}$ | % by volume of majority phase |
|---|---|---|---|---|---|---|
| 7 | $Al_{63}Cu_{17.5}Co_{17.5}Si_2$ | 1.3 ± 0.06 | 4200 ± 200 | 675 | 3.7 | >95% O'/D' |
| 8 | $Al_{71}Pd_{19}Mn_{10}$ | 1.0 | | | | 100% I' |
| 9 | Al fcc | 90–100 | 2700 | 900 | 230 | |
| 10 | $Al_2O_3$ | 8.5 | 3800 | 1050 | 34 | |
| 11 | Stainless steel | 4 | 7850 | 480 | 15 | |
| 12 | $ZrO_2$—8%$Y_2O_3$ | 0.8 | 5700 | 400 | 2 | |
| 13 | $Al_6Mn$ | 5.4 | | | | |
| 14 | $Al_{13}Si_4Cr_{14}$ | 7.4 | | | | |
| 15 | $Al_5Ti_2Cu$ | 7.0 | | | | |
| 16 | $Al_7Cu_2Fe$ | 6.2 | | | | |
| 17 | $Al_2Cu$ | 14–17 | | | | |

In this table the symbols in the last column have the following meaning:

m: monoclinic approximant (P. J. Black, Acta Cryst. 8 (1955) 43)

O: orthorhombic approximants (C. Dong, J. M. Dubois, J. Materials Science, 26 (1991), 1647

D: decagonal phase (L. Bendersky, Quasicrystal with One Dimensional Translational Symmetry and a Tenfold Rotation Axis, Physical Review Letters, vol. 55, No. 14, 1985, pages 1461–1463).

R: rhombohedral approximant (M. Audier and P. Guyot, 3rd Int. Meeting on Quasicrystals, eds. J. Yacaman, World Scientific, Singapore, 1990).

I: icosahedral phase (D. Shechtman, I. Blech, D. Gratias, J. W. Cahn, Metallic Phase with Long-Range Orientational Order and No Translational Symmetry, Physical Review Letters, vol. 53, No. 20, 1984, pages 1951–1953)

O': orthorhombic approximants (C. Dong et al, J. Mat. Science, vol. 26, 1991, 1647)

D': decagonal phase (W. Steurer, K. H. Kuo, Phil. Mag. Letters, 62–3, 1990, 115–182

I': icosahedral phase (L. X. HE, et al. Phil. Mag. Lett. 61 (1990) 15)

These results reveal that, at ambient temperature, the thermal conductivity of the quasicrystalline alloys constituting the protection elements of the present invention (samples 1 to 8) is considerably lower than that of metallic materials (aluminum metal or tetragonal $Al_2Cu$), which are given by way of comparison. It is lower by two orders of magnitude than that of aluminum and by one order of magnitude than that of stainless steel, usually considered to be a good thermal insulator. In addition, it is lower than that of alumina and quite comparable with that of zirconia doped with $Y_2O_3$, considered to be the archetype of thermal insulators in industry.

By way of comparison, the diffusivity of alloys 13 to 17 was determined. These alloys, which form definite aluminum compounds, have compositions close to those of the quasicrystalline alloys which can be employed for the protection elements of the present invention. However, they do not have the quasicrystalline structure defined above. In all cases their thermal diffusivity is higher than $5 \times 10^{-1}$ m$^2$/s, that is to say much higher than that of the alloys adopted for the present invention.

EXAMPLE 3

The values of $\alpha$ have been recorded as a function of temperature up to 900° C.

Measurement of thermal diffusivity was performed by the method of Example 2. Each test piece was placed under a flow of purified argon in the center of a furnace heated by a Joule effect; the rate of temperature rise, programmed by computer, varied linearly at a rate of 5° C./min. All the samples in accordance with the present invention exhibit an approximately linear increase in $\alpha$ with temperature. The value of $\alpha$ determined at 700° C. is nearly double that measured at the ambient temperature. Similarly, the specific heat increases with temperature and reaches from 800 to 900 J/kg K at 700° C. The specific mass decreases by of the order of 1 to 2%, as shown by the measurements of thermal expansion or of neutron diffraction. Consequently, thermal conductivity remains lower than 12 W/m K, that is to say than the thermal conductivity of the stainless steels which are employed for some thermal insulation applications. Much better performance, however, is observed in the case of certain alloys: for example, in the case of the alloy $Al_{63.5}Cu_{24}Fe_{12.5}$ (alloy 4), $\lambda$ is 3.2 W/m K at 700° C.

Figure 1:
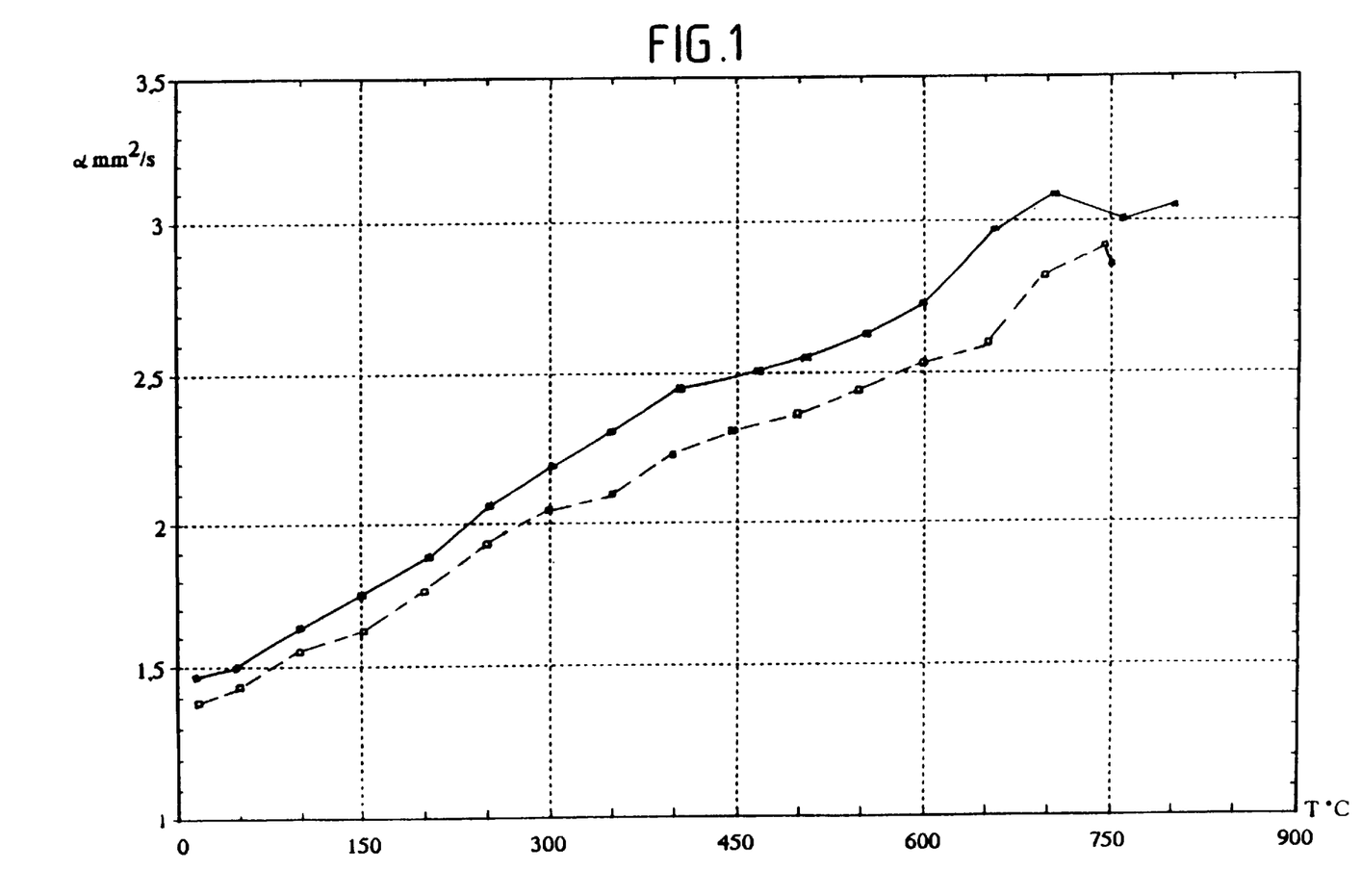
FIG. 1 shows the change in $\alpha$ as a function of the temperature, T, for heating, represented by black squares, and cooling, represented by white squares, $Al_{65}Cu_{20}Fe_{10}Cr_5$ (alloy 3).
Figure 2:
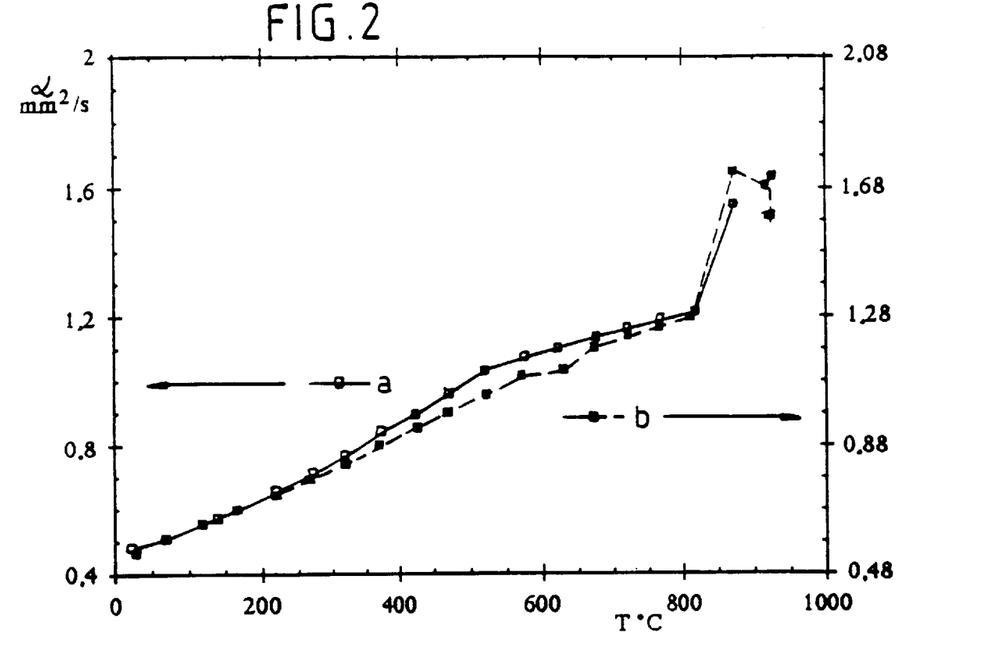
FIG. 2 shows the change in $\alpha$ as a function of the temperature, T, for heating the alloy $Al_{63.5}Cu_{24}Fe_{12.5}$ (alloy 5) in the rhombohedral approximant, (a), and icosahedral phase, (b), states.
Figure 3:
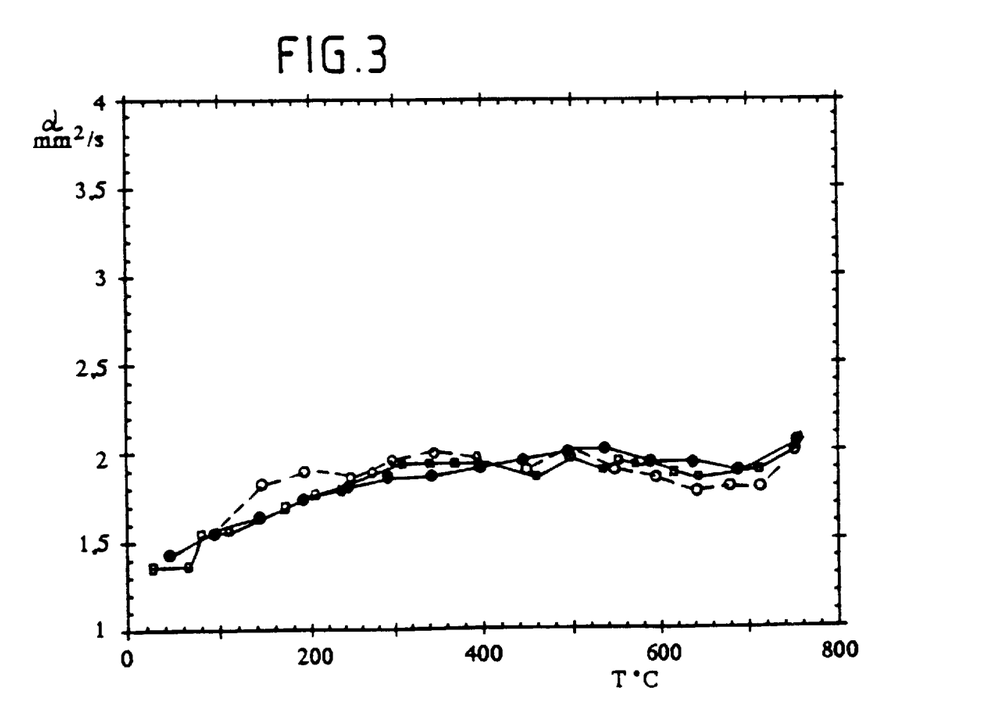
FIG. 3 shows the change in $\alpha$ as a function of the temperature, T, for the alloy heating $Al_{63}Cu_{17.5}Co_{17.5}Si_2$ (alloy 7). The measurements recorded during the first heating are shown by a circle. The measurements recorded during the first cooling are shown by a black disk. The measurements recorded during the second heating are shown by a square.

FIGS. 1, 2 and 3 show, respectively, the change in $\alpha$ as a function of the temperature T for different materials under the following conditions:

FIG. 1: the measurements recorded during the heating of the alloy $Al_{65}Cu_{20}Fe_{10}Cr_5$ (alloy 3) are shown by black squares, those recorded during the cooling by white squares.

FIG. 2: heating in the case of the alloy $Al_{63.5}Cu_{24}Fe_{12.5}$ (alloy 5) in the rhombohedral approximant (a) and icosahedral phase (b) states. Above 860° C. the alloy is transformed into a mixture of crystalline phases hence the increase in $\alpha$- and then melts at about 950° C.

FIG. 3: $Al_{63}Cu_{17.5}Co_{17.5}Si_2$ (alloy 7). The measurements shown by a circle were recorded during a first heating; those shown by a black disk were recorded during the first cooling and those shown by a square during a second heating. It appears that the diffusivity is reversible and varies between 1.3 and $2 \times 10^{-6}$ m$^2$/s between 20° C. and 750° C.

EXAMPLE 4

The variation in the thermal expansion of the alloys $Al_{63.5}Cu_{24}Fe_{12.5}$ and $Al_{63}Cu_{17.5}Si_2$ was measured. The corresponding thermal expansion curves reveal that the expansion coefficient shows very little dependence on temperature and has the value of $8 \times 10^{-6}$/°C. in the first case mentioned and $11 \times 10^{-6}$/°C. in the second case, these values being close to those for stainless steels.

EXAMPLE 5

The superplastic behavior of certain alloys capable of constituting the heat protection elements of the present invention was studied. Cylindrical test pieces 4 mm in diameter and 10 mm in length, with strictly parallel faces, were produced by the same method as those of Example 1 with the alloys $Al_{63.5}Cu_{24}Fe_{12.5}$ and $Al_{62.5}Cu_{18.5}Fe_8Cr_8Si_3$. These test pieces were subjected to mechanical tests in compression on an Instrom machine. Tests were performed up to a load of 250 MPa, at a beam travel speed of 50 μm/min, the temperature being kept constant between 600° and 850° C. The alloys exhibit a superplastic behavior from 600° C. onwards.

EXAMPLE 6

Production of heat protection elements according to the invention and according to the prior art.

A first series of samples was produced. The substrate was a solid copper cylinder which had a diameter of 30 mm and a height of 80 mm and the coating was applied with the plasma torch by a conventional technique. Sample C0 is the uncoated copper cylinder. Sample C1 was coated over its whole surface with a 1-mm thick layer of the alloy $Al_{65.5}CU_{18.5}Fe_8Cr_8$ (alloy 2). Sample C6 comprises a layer of a material constituting the heat protection element of the present invention, used as bonding layer, and a layer of yttriated zirconia. Samples C3 and C4, used for comparison, comprise a layer of zirconia and a layer of alumina respectively.

Another series of samples was produced with, as support, a stainless steel tube which had a length of 50 cm, a diameter of 40 mm and a wall thickness of 1 mm (samples A0 to A2). In each case the support tube is coated at one of its ends over a length of 30 cm. In this latter case the deposits were produced with an oxygen-gas torch, except for the zirconia deposit of sample A2, which was produced with the plasma torch. Table 2 below gives the nature and the thickness of the layers for the different samples. The accuracy of the final thicknesses of the deposits was ±0.3 mm.

Figure 4:
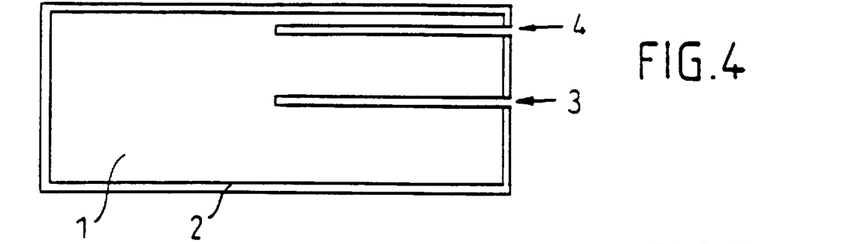
FIG. 4 shows a sample of a copper cylinder substrate used in Example 6 of the specification.

All the samples were provided with chromel-alumel thermocouples of very low inertia. FIG. 4 shows a sample of the copper cylinder type 1 comprising a coating 2 and provided with a central thermocouple 3 and a side thermocouple 4, both being inserted as far as half the length of the cylinder.

EXAMPLE 7

Use of the protection elements as protection in relation to a flame.

Samples C0, C1, C3 and C6 were placed on their base on a refractory brick. Successive heat pulses 10 s in duration were applied to each test piece at 60-s intervals and the response of the thermocouples was recorded. These pulses were produced by the flame of a torch placed at a constant distance from the sample and pointed facing the thermocouple close to the surface. The flow rate of the combustion gases was carefully controlled and kept constant throughout the experiment. Two series of experiments were conducted: one with the test pieces initially at 20° C. and the other with the test pieces initially at 650° C.

Sample C0 makes it possible to define three parameters which summarize the results of the experiments, namely the maximum difference P in temperature between the two thermocouples, ΔT/Δt the rate of temperature rise of the side thermocouple 4 during the pulse and the temperature increment ΔT produced in the center of the test piece (thermocouple 3). These data appear in Table 2. These results show that the protection elements of the present invention, employed as a heat barrier, have a performance which is at least equivalent to that of zirconia.

In samples C6 and A2 the heat protection elements of the present invention constitute an underlayer. It was found that the zirconia layer of sample C3 did not stand up to more than three heat pulses and was fissured from the first pulse onwards. In the case of sample C6, also subjected to a series of heat pulses, the surface temperature of the zirconia deposit, measured by a third thermocouple placed in contact with the deposit at the end of the tests, became stabilized at 1200° C. The experiment involved 50 pulses and sample C6 resisted without apparent damage, although the coefficient of expansion of copper is close to twice that of the quasi-crystalline alloy, which would imply high shear stresses at the substrate/deposit interface, if the underlayer material did not become plastic. The heat protection elements of the present invention are therefore well suited for the production of bond coats, in particular for heat barriers.

TABLE 2

| | | 20–100° C. | | | 650–550° C. | | |
|---|---|---|---|---|---|---|---|
| | Coating material | ΔT ±0.5° C. °C. | ΔT/Δt °C./s | P ±0.5° C. °C. | ΔT ±0.5° C. °C. | ΔT/Δt °C./s | P ±0.5° C. °C. |
| C0 | none | 27 | 2.85 | 5.4 | 22 | 2.3 | <1 |
| C1 | 1 mm $Al_{65.5}Cu_{18.5}Fe_8Cr_8$ | 25 | 2.7 | 3.8 | 11 | 1.1 | 6 |
| C6 | 0.5 mm $Al_{65.5}Cu_{18.5}Fe_8Cr_8$ 1 mm $ZrO_2$—8%$Y_2O_3$ | 24 | 2.6 | 4.0 | 13 | 1.0 | 2.5 |
| C3 | 1 mm zirconia | 24 | 2.75 | 4.7 | 14 | 1.5 | 2.3 |
| C4 | 1 mm alumina | 27 | 2.7 | 6.5 | 25 | 3.0 | 8.2 |
| A0 | none | — | — | — | — | — | — |
| A1 | 1.5 mm $Al_{65.5}Cu_{18.5}Fe_8Cr_8$ | — | — | — | — | — | — |
| A2 | 0.3 mm $Al_{65.5}Cu_{18.5}Fe_8Cr_8$ 1.2 mm $ZrO_2$—8%$Y_2O_3$ | — | — | — | — | — | — |

Figure 5:
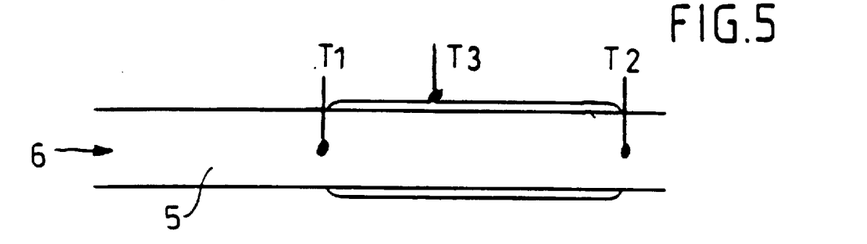
FIG. 5 shows a hollow tube substrate used in Examples 6 and 8 of the specification.

FIG. 5 shows a hollow tube 5 through which a flow of hot air 6 is passed and which is provided with three thermocouples indicated by T1, T2 and T3 respectively, the first two being inside the tube and placed, respectively, at the beginning of the coated zone and at the end of the coated zone, and the third being on the surface of the coating.

EXAMPLE 8

Application of a heat protection element of the present invention to the insulation of a jet engine.

Samples A0 and A1 were employed to evaluate the suitability of the alloys of the invention for heat-insulating a device. A comparison was made in relation to the properties of a zirconia barrier provided with a bonding layer (sample A2). Each of the samples was equipped with 3 thermocouples T1, T2 and T3 as shown in FIG. 5. A stream of hot air at a constant flow rate was passed through the stainless steel tube forming the substrate of each sample. The temperature of the air at the entry, measured with the aid of the thermocouple T1, was 300°±2° C. The surface temperature, measured with the aid of the thermocouple T3, was recorded as a function of time starting with the switching-on of the hot air generator. Thermocouple T2 made it possible to verify that the transient conditions for establishing the hot air flow were identical in the case of all the measurements.

Figure 6:
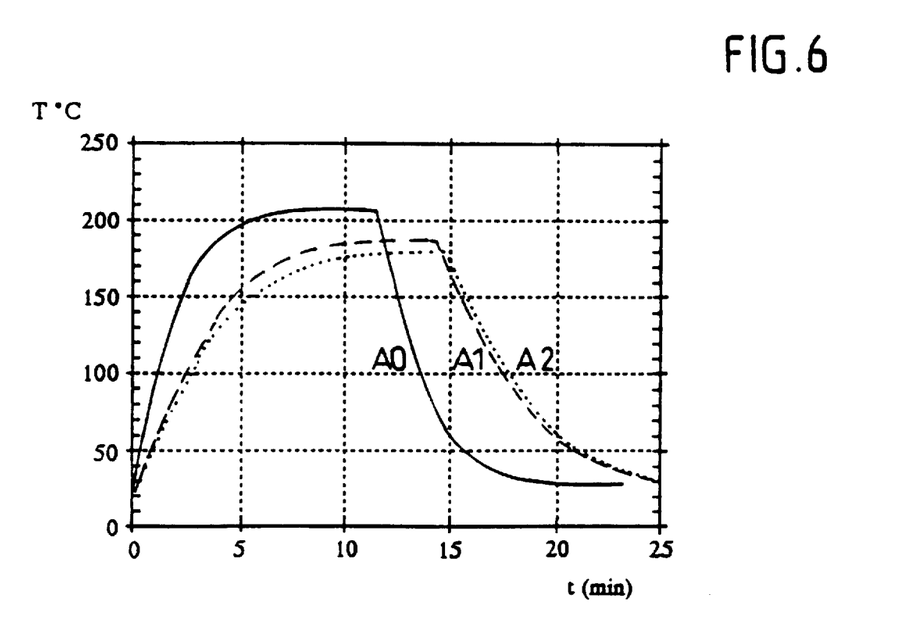
FIG. 6 shows the change in the surface temperature of samples according to Example 8 of the specification.

FIG. 6 shows the change in the surface temperature of each of the samples A0, A1 and A2 as a function of time. The surface temperature of sample A0 (without coating) exceeds that of the zirconia sample by approximately 35° C. at equilibrium. The heat protection elements of the present invention give results close to that for the zirconia layer, since a temperature difference of only 10° C. is measured between sample A1 (quasi-crystalline coating) and sample A2 (zirconia coating used as reference).

We claim:

1. A composite structure comprising a substrate and a heat protection element on the substrate, wherein the heat protection element consists essentially of a quasicrystalline aluminum alloy consisting essentially of one or a number of quasicrystalline phases which are either quasicrystalline phases in the strict sense, or approximating phases, wherein said quasicrystalline phases exhibit a thermal diffusivity, measured at ambient temperature, lower than $2.5 \times 10^{-6}$ $m^2$/s, and a thermal diffusivity measured in the temperature range 650°–750° C. which does not exceed the thermal diffusivity measured at ambient temperature by more than a factor of 3, and wherein said quasicrystalline aluminum alloy consists essentially of:

$Al_a Pd_b Mn_c X_d E_e T_f G_g$, wherein X represents at least one metalloid selected from the group consisting of B, C, Si, Ge, P, and S; E represents at least one metal selected from the group consisting of Fe, Mn, V, Ni, Cr, Zr, Hf, Mo, W, Nb, Ti, Rh, Ru, Re, and Ta; T is at least one rare earth; G represents the unavoidable production impurities; and wherein a+b+c+d+e+f+g=100 atom %; $15 \leq b \leq 25$; $6 \leq c \leq 16$; $21 \leq b+c+e \leq 45$; $0 \leq f \leq 4$; $0 \leq g \leq 2$; $0 \leq d \leq 5$ wherein the heat protection element on the substrate comprises at least 80% by volume of at least one quasicrystalline phase.

2. A composite structure according to claim 1, wherein the thermal diffusivity at ambient temperature is lower than $1.6 \times 10^{-6}$ $m^2$/s.

3. A composite structure according to claim 1, wherein the aluminum alloy has a porosity higher than 10%.

4. A composite structure according to claim 1, wherein the heat protection element is employed in the form of a coating on the substrate and wherein the heat protection element constitutes a heat barrier at temperatures which are lower than 700° C.

5. A composite structure according to claim 1, wherein the alloy contains stabilizing elements at a content of less than 2% in number of atoms, which are selected from the group consisting of W, Zr, Ti, Rh, Nb, Hf, and Ta.

6. A composite structure according to claim 5, wherein the aluminum alloy includes at least one of said stabilizing elements.

7. A composite structure according to claim 1, wherein the heat protection element is employed in the form of an intermediate layer between the substrate and a heat barrier.

8. A composite structure according to claim 1, wherein the heat protection element comprises alternating layers of quasicrystalline aluminum alloys and layers of heat conducting materials.

9. A composite structure according to claim 1, wherein d is greater than zero.

10. A composite structure according to claim 1, wherein e is greater than zero.

11. A composite structure according to claim 1, wherein f is greater than zero.

12. A composite structure according to claim 1, wherein the substrate comprises a metal.

13. A method for manufacturing a composite structure comprising coating a substrate with a heat protection element, wherein the heat protection element consists essentially of a quasicrystalline aluminum alloy consisting essentially of one or a number of quasicrystalline phases which are either quasicrystalline phases in the strict sense, or approximating phases, wherein said quasicrystalline phases exhibit a thermal diffusivity, measured at ambient temperature, lower than $2.5 \times 10^{-6}$ $m^2$/s, and a thermal diffusivity measured in the temperature range 650–°750° C. which does not exceed the thermal diffusivity measured at the ambient temperature by more than a factor of 3, and wherein said quasicrystalline aluminum alloy consists essentially of:

$Al_a Pd_b Mn_c X_d E_e T_f G_g$, wherein X represents at least one metalloid selected from the group consisting of B, C, Si, Ge, P, and S; E represents at least one metal selected from the group consisting of Fe, Mn, V, Ni, Cr, Zr, Hf, Mo, W, Nb, Ti, Rh, Ru, Re, and Ta; T is at least one rare earth; G represents the unavoidable production impurities; and wherein a+b+c+d+e+f+g=100 atom %; $15 \leq b \leq 25$; $6 \leq c \leq 16$; $21 \leq b+c+e \leq 45$; $0 \leq f \leq 4$; $0 \leq g \leq 2$; $0 \leq d \leq 5$ wherein the heat protection element deposited on the substrate comprises at least 80% by volume of at least one quasicrystalline phase.

14. A method according to claim 13, wherein the heat protection element is coated on the substrate by thermal spraying.

* * * * *